(12) United States Patent
Hilliard et al.

(10) Patent No.: US 6,338,457 B1
(45) Date of Patent: Jan. 15, 2002

(54) PRECISION PARACHUTE RECOVERY SYSTEM

(75) Inventors: Donald Patrick Hilliard; Michael Patrick Hilliard, both of Oxnard, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/736,721

(22) Filed: Dec. 12, 2000

(51) Int. Cl.$^7$ .................................................. B64D 1/08
(52) U.S. Cl. ...................... 244/139; 244/137.4; 244/152
(58) Field of Search ............................. 244/139, 138 R, 244/142, 152, 137.4, 137.3

(56) References Cited

U.S. PATENT DOCUMENTS

| | | | |
|---|---|---|---|
| 4,659,041 A | * 4/1987 | Dellinger et al. | 244/139 |
| 4,753,400 A | 6/1988 | Reuter et al. | 244/110 |
| 4,834,317 A | 5/1989 | Deppner | 244/1 TD |
| 4,884,769 A | 12/1989 | Snead et al. | 244/145 |
| 4,892,272 A | 1/1990 | Hadzicki | 244/153 R |
| 5,363,737 A | 11/1994 | Wallis | 89/1.54 |
| 5,620,153 A | 4/1997 | Ginsberg | 244/13 |
| 5,678,788 A | * 10/1997 | Hetzer et al. | 244/152 |
| 5,738,307 A | * 4/1998 | Webb | 244/152 |
| 6,082,675 A | * 7/2000 | Woodall, Jr. et al. | 244/137.4 |

* cited by examiner

Primary Examiner—J. Woodrow Eldred
(74) Attorney, Agent, or Firm—David Kalmbaugh

(57) ABSTRACT

A parachute recovery system which provides for the recovery of a payload such as a target drone without damage by allowing for a safe, non-destructive landing of the payload at a desired landing location. The parachute recovery system comprises a payload, a parachute or parasail and a guidance control electronics and servo system. The parachute, which is rectangular in shape, is connected by a plurality of control lines to the guidance control electronics and servo system, which is attached to the payload. The payload may be an air launch component such as a spacecraft, a target drone, unmanned air vehicle, camera film, or similar apparatus. The guidance control electronics and servo system is used to control glide path trajectory and provide for a safe non-destructive landing of the payload. Servo system adjust the length of each of the plurality of control lines attached to the parachute to provide a means for controlling the parachute so as to control the speed, direction and lift of the parachute recovery system.

14 Claims, 2 Drawing Sheets

PRECISION PARACHUTE RECOVERY SYSTEM

BACKGROUND OF THE INVENTION

1. Field of the Invention

The present invention relates generally to recovery systems used for recovery of a target drone. More particularly, the present invention relates to a precision parachute used in the recovery of a drone target which substantially reduces the possibility of damage to the target drone.

2. Description of the Prior Art

For many years, parachutes have been used for the flight and recovery stage of spacecraft, target drones, camera film and similar items. A problem with ordinary parachutes, which may be circular or conical in design, is that they descend almost vertically through the airstream and are generally carried with the prevailing winds and air currents. This leads to uncertainty as to the landing point. The landing point may be, for example, in rugged and remote mountainous terrain which is difficult or even impossible to reach for retrieval aircraft such as a helicopter.

In addition, the rate of descent of these parachutes is generally in the order of fifteen to twenty-five feet per second. The result may be a rough landing on a solid surface which could lead to damage to the payload the parachute is attached to. When, for example, the payload is a target drone and the target drone is damaged during a rough landing, the cost to repair the target drone can be significant. In addition, the target drone can be totally destroyed during an extremely rough landing, which can result in a loss of several hundred thousand dollars to the military. For example, the BQM-34 aerial target cost the military about half million dollars.

Landings are often conducted on water to avoid rough landings. These water landings involve other complexities, such as auxiliary flotation devices, to keep the payload from sinking. These water landings also require that the payloads be of a type that cannot be damaged by water and be of the type that are protected against water damage.

Ram-air inflated parachutes, such as those used by sports sky divers, are able to move horizontally as much as three or four feet for every foot of vertical descent. This allows the parachutes to make headway into a fairly stiff wind of up to twenty or thirty knots.

However, a pilot is required to steer these ram-air inflated parachutes to the selected landing point. Specifically, Ram-air inflated parachutes are steered by pulling down on a pair of steering toggles which lower trailing edge flaps at the rear of the canopy. Pulling down on the right flap steers the canopy to the right and pulling down on the left flap steers the canopy to the left. Pulling on both flaps simultaneously results in a flair which reduces forward speed and vertical descent rate for a short period of time. This allows for a much more precise and gentle touchdown and landing than a parachute of conventional design.

Since a pilot is required for the use of ram-air inflated parachutes to land a payload for the purpose of recovering the payload, ram-air inflated parachutes are not the optimal choice for use in the recovery of a payload such as a target drone.

It is preferable that a parachute operate in a manner similar to a ram-air inflated parachute but not require the use of a pilot to steer the parachute.

SUMMARY OF THE INVENTION

The present invention overcomes some of the disadvantages of the prior art including those mentioned above in that it comprises a relatively simple yet highly effective precision parachute recovery system which provides for the recovery of a payload such as a target drone without damage by allowing for a safe, non-destructive landing of the payload at a desired location.

The parachute recovery system of the present invention comprises a payload, a parachute or parasail and a guidance control electronics and servo system. The parachute, which is rectangular in shape, is connected by a plurality of control lines to the guidance control electronics and servo system, which is attached to the payload. The payload may be an air launch component such as a spacecraft, a target drone, unmanned air vehicle, camera film, or similar apparatus.

The guidance control electronics and servo system is used to control glide path trajectory and provide for a safe non-destructive landing of the payload. The servo system adjusts the length of each of the plurality of control lines attached to the parachute to provide a means for controlling the parachute so as to control the speed, direction and lift of the parachute recovery system.

An antenna and its associated receiver receives GPS data from a transmitting station. The GPS data may include longitude, latitude and altitude data as well as rate of descent data which the guidance control electronics and servo system processes to steer the precision recovery system to a precise location and to control the rate of descent of the recovery system allowing for a gentle touchdown and soft landing of the payload. The guidance control electronics and servo system includes a digital computer and a plurality of servos each servo of which adjust the length of one of the control lines to steer the parachute recovery system to a safe non-destructive landing of the payload.

DETAILED DESCRIPTION OF THE PREFERRED EMBODIMENT

Figure 1:
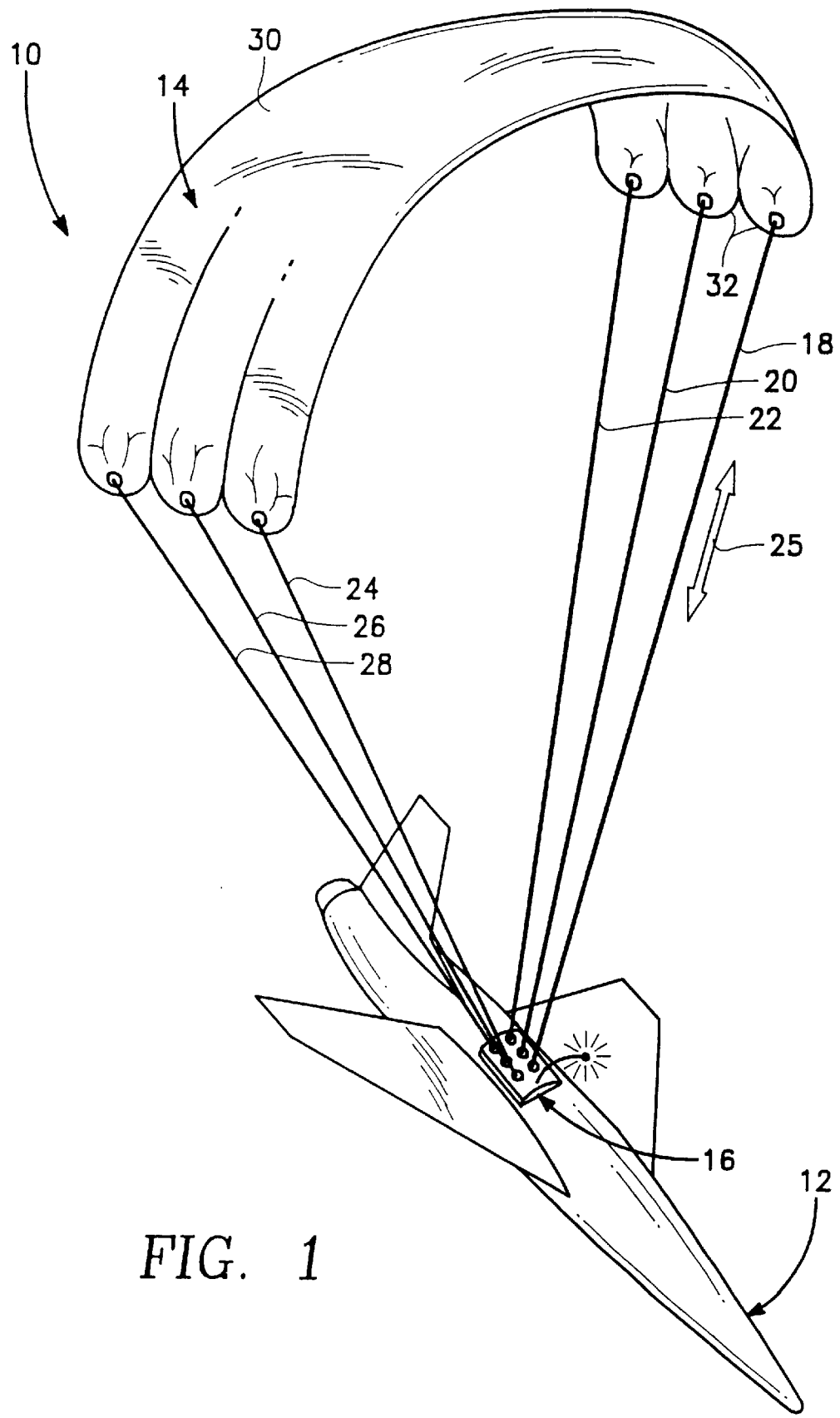
FIG. 1 is a perspective view illustrating the precision parachute recovery system for use in the retrieval of a payload which constitutes the present invention.

Referring first to FIG. 1, there is shown the precision parachute recovery system 10 in accordance with the present invention. The precision parachute recovery system 10 comprises a payload 12, a parachute or parasail 14 and the guidance control electronics and servo system 16. Parachute 14 is connected by a plurality of suspension or control lines 18, 20, 22, 24, 26 and 28 to the guidance control electronics and servo system 16, which is attached to the payload 12. Parachute 14 must be of sufficient size to support the weight of payload 12.

Payload 12 can be any desired object or payload. Payload 12 may, for example, be an air launch component such as a spacecraft, a target drone, unmanned air vehicle, camera film, or similar apparatus. As shown in FIG. 1, payload 12 is a target drone such as a MQM-107 aerial target used by the military to test and evaluate the performance of missiles and other weapon systems. In flight, payload 12 is supported by parachute 14. Since the cost of target drones may exceed a million dollars, it is highly desirable to have a safe, non-destructive landing of the payload in a location which is easily accessible to a recovery crew.

Parachute 14 may be any parachute which is steerable such as a ram-air parachute or a parasail. Ram-air parachutes are well known in the prior art and are designed to include a fabric parachute body 30 having a plurality of individual cells 32 arranged side-by side along the width of the parachute 14.

Parachute 14 may be constructed from any of a number of parachute fabrics including Nylon, Dacron, Kevlar or the like and may be generally rectangular in plan view, and may have an airfoil section such that lift may be developed by forward motion. The shape of the parachute body 30 may be sustained by the air flow over and through parachute body 30 as is known in the art. The specific parachute design may be tailored to the weight and size of the payload affixed to the parachute.

Control lines 18, 20, 22, 24, 26 and 28 may comprise cables or ropes used to carry aircraft, such as drone 12 and may typically be constructed from materials such as Dacron, Kevlar, Spectra or the like. Control lines 18, 20, 22, 24, 26 and 28 provide a means for controlling parasail 14

Figure 2:
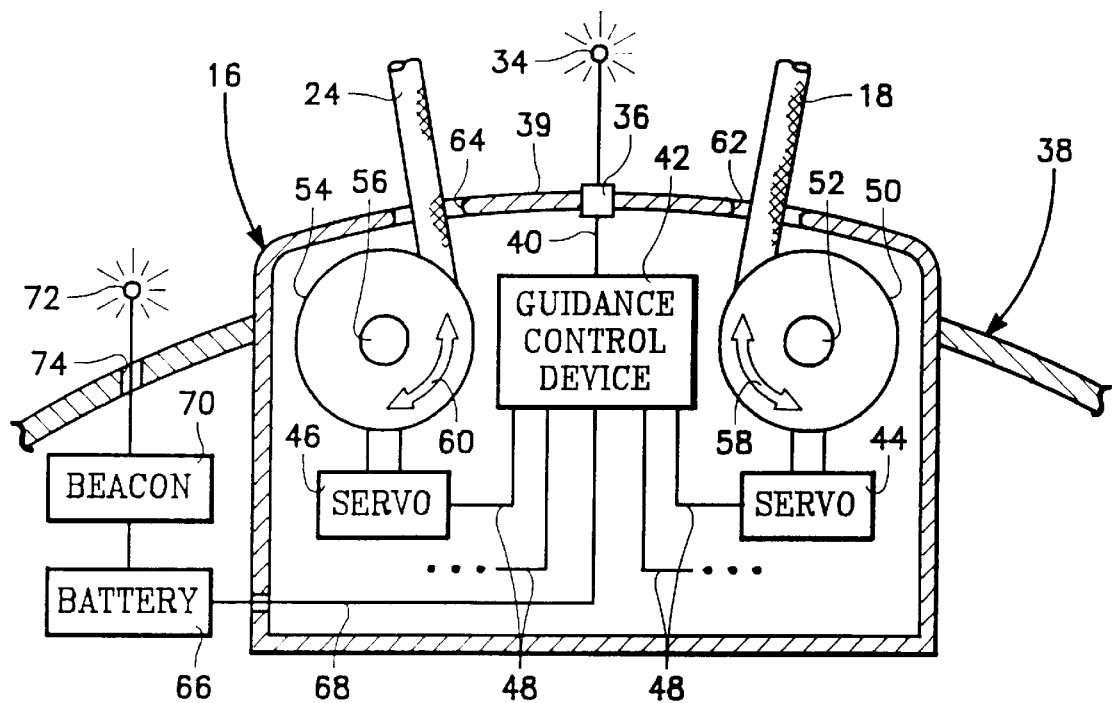
FIG. 2 illustrates a side view illustrating the control electronics and servo system for the parachute recovery system of FIG. 1.

Referring to FIGS. 1 and 2, the guidance control electronics and servo system 16 is used to control glide path trajectory and provide for a safe non-destructive landing of the payload 12. Servo system 16 adjusts the length of each of the control lines 18, 20, 22, 24, 26 and 28 thereby providing a means for controlling parachute 14 so as to control the speed, direction and lift of precision parachute recovery system 10.

Payload trajectory control in the air may be accomplished by controlling the relative location of parachute body 30 and the rest of recovery system 10 and varying the angle of attack of the parachute body 30. Payload trajectory control in the air may, for example, be accomplished by lowering a portion of the back and of parachute body 10. This requires shortening control lines 22 and 28.

Referring to FIG. 2, the guidance control electronics and servo system 16 used in the preferred embodiment of the present invention may include an antenna 34 and its associated receiver 36 which receives external signals. These signals may be used by guidance control electronics and servo system 16 to direct the flight of the precision parachute recovery system 10. External signals may include direct control signals from a transmitting (e.g. ship or aircraft) or ground station. The external signals may be also be GPS data from GPS satellites or from a transmitting station.

The GPS or other position data may be in a radio frequency signal format from a transmitting or ground station (not illustrated). The GPS data or other position data may include longitude, latitude and altitude data as well as rate of descent data which the guidance control electronics and servo system 16 processes to steer the recovery system 10 to a precise location and to control the rate of descent of the recovery system 10 allowing for a gentle touchdown and soft landing of payload 12. As shown in FIG. 2 antenna 34 and receiver 36 are mounted on the upper surface 39 of a support structure 38 which has the electro-mechanical elements of the guidance control electronics and servo system 16 mounted therein.

It should be noted that receiver 36 may be an internal unit which does not have to be mounted on the upper surface the upper surface 39 of a support structure 38.

The GPS data received by antenna 34 is transferred via an electrical cable 40 to a guidance control device 42. The guidance control device 42 then processes the GPS data generating a plurality of digital positioning commands/signals which are converted to an analog format prior to being supplied to a plurality of servo motors 44 and 46. Electrical cables 48 connect each of the plurality of servo motors 44 and 46 to guidance control device 42.

At this time it should be noted that guidance control device 42 may be a commercially available light weight, compact, impact resistant digital computer or microprocessor.

The plurality of servo motors each have a shaft and a capstan/spool attached to the shaft of the servo motor. As shown in FIG. 2, capstan 50 is attached to the servo motor shaft 52 for servo 44, while capstan 54 is attached to the servo motor shaft 56 for servo 46. Control line 18 is wound around capstan 50 and control line 24 is wound around capstan 54. Each of the remaining control lines 20, 22, 26 and 28 has a servo associated with the control line 20, 22, 26 and 28.

The capstan 50 rotates in the clockwise direction to lengthen/extend control line 18 and in the counterclockwise direction to shorten/retract control line 18 (as indicated by arrow 58). The capstan 54 rotates in the counterclockwise direction to lengthen/extend control line 24 and in the clockwise direction to shorten/retract control line 24 (as indicated by arrow 60). The control lines 18 and 24 respectively pass through openings 62 and 64 within the upper surface 39 of support structure 38.

There is a rechargeable battery 66 mounted within support structure 38 which is connected to guidance control device 42 by an electrical cable 68 to supply power to guidance control device 42. Power for the servos 44 and 46 is routed through guidance control device 42 and electrical cables 48 to each servo 44 and 46. Power for recharging the battery 66 may also be provided by the engine of the target drone 12.

Recovery system 10 also includes a beacon 70 which has an antenna 72 for transmitting radio frequency signals to the ground station. These radio frequency signals provide data relating to the altitude of recovery system 10, the rate of descent of recovery system 10, direction of flight of recovery system 10 and the current position of recovery system 10 including its latitude and longitude. Computers at the ground station process this data calculating new GPS coordinate and rate of descent data which is then transmitted to the guidance control device 42. The guidance control device 42 generates new positioning signals which are supplied to the servos for each of the control lines 18, 20, 22, 24, 26 and 28 adjusting the length of the control lines 18, 20, 22, 24, 26 and 28 as required to steer the parachute recovery system 10 on a flight path which allows for a gentle touchdown and soft landing of payload 12.

At this time it should be noted that the number of control lines from the six control lines illustrated in FIG. 1. For example, recovery system 10 could have eight, ten of twelve control lines and their associated servos to steer recovery system 10.

It should also be noted that guidance control device 42 can be programmed to control glide path trajectory and provide for a safe non-destructive landing of the payload without requiring the use of a ground station to process position data relating to the current position of recovery system 10 including its latitude and longitude.

Figure 3:
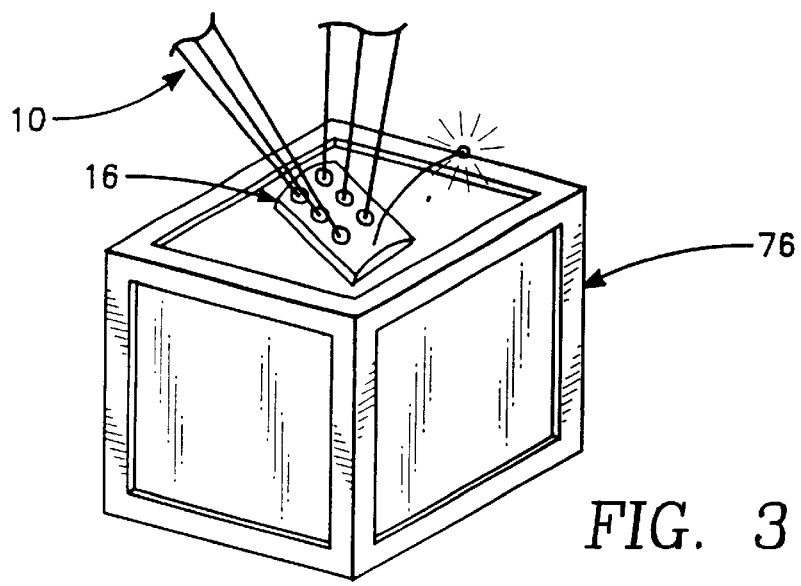
FIG. 3 is a perspective view illustrating the bottom portion of the parachute recovery system of FIG. 1 affixed to a payload.

Referring now to FIGS. 1 and 3, there is shown a container 76 which is another type of payload compatible with parachute recovery system 10. Container 76 may, for example, have precision instruments, camera film or other apparatus contained therein which require that recovery system 10 have a non-destructive landing to prevent damage to container 76 and its contents.

Container 76 may also be a package that needs to be precisely delivered to a target landing area such as for a search and rescue operation or for military operations involving the use of special forces.

From the foregoing, it may readily be seen that the present invention comprises a new, unique and exceedingly useful precision parachute recovery system which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. A precision parachute recovery system comprising:
   (a) a generally rectangular shaped parachute having a parachute body, said parachute body having a plurality of individual cells arranged side-by-side along the width of said parachute;
   (b) a plurality of control lines having one end thereof connected to said parachute and an opposite end;
   (c) a servo system having the opposite end of each of said control lines connected thereto, said servo system separately adjusting the length of each of said control lines to steer said parachute, said servo system including:
      (i) an antenna for receiving position data in a radio frequency signal format;
      (ii) a digital computer connected to said antenna to receive said position data;
      (iii) a plurality of servo motors connected to said digital computer, each of said servo motors having a shaft and a capstan attached to the shaft of each of said servo motors, the capstan of each servo motor having the opposite end of only one of said control lines connected thereto;
      (iv) said digital computer processing said position data to generate a plurality of positioning signals and to provide said positioning signals to said servo motors;
      (v) said servo motors, responsive to said positioning signals, rotating said capstans to continuously adjust the length of each of said control lines steering said parachute on a flight path to a non-destructive landing of said parachute precision recovery system; and
   (d) a payload removably coupled to said servo system to allow said payload to be removed from said servo system after the non-destructive landing of said precision parachute recovery system.

2. The parachute recovery system of claim 1 wherein said plurality of control lines comprises six control lines.

3. The parachute recovery system of claim 1 wherein said payload comprises a target drone.

4. The parachute recovery system of claim 1 wherein said comprises a container having therein a package which is delivered to a precise location when said parachute recovery system executes said non-destructive landing.

5. The parachute recovery system of claim 1 wherein said servo system further comprises a beacon having an antenna for transmitting radio frequency signals which provide location data for said parachute recovery system relating to a direction of flight of said parachute recovery system and a current position for said parachute recovery system.

6. The parachute recovery system of claim 5 wherein said servo system further comprises a battery connected to said beacon and said guidance control device.

7. The parachute recovery system of claim 1 wherein said guidance control device comprises a microprocessor.

8. The parachute recovery system of claim 1 wherein said position data comprises Global Positioning System data.

9. The parachute recovery system of claim 8 wherein said Global Positioning System data includes longitude, latitude and altitude data and rate of descent data for said parachute recovery system which said control system processes to steer said parachute recovery system to a precise location and to control a rate of descent for said parachute recovery system allowing for a non-destructive touchdown and said non-destructive landing of said payload.

10. A precision parachute recovery system comprising:
    (a) a generally rectangular shaped parachute having a parachute body, said parachute body having a plurality of individual cells arranged side-by-side along the width of said parachute;
    (b) a plurality of control lines having one end thereof connected to said parachute and an opposite end;
    (c) a servo system having the opposite end of each of said control lines connected thereto, said servo system separately adjusting the length of each of said control lines to steer said parachute including:
       (i) an antenna for receiving global positioning system data in a radio frequency signal format, said global positioning system data, said global positioning data including longitude, latitude and altitude data and rate of descent data for said precision parachute recovery system;
       (ii) a digital computer connected to said antenna to receive said global positioning system data;
       (iii) a plurality of servo motors connected to said digital computer, each of said servo motors having a shaft and a capstan attached to the shaft of each of said servo motors, the capstan of each servo motor having the opposite end of only one of said control lines connected thereto;
       (iv) said digital computer processing said global positioning system data to generate a plurality of positioning signals and to provide said positioning signals to said servo motors;
       (v) said servo motors, responsive to said positioning signals, rotating said capstans to continuously adjust the length of each of said control lines to steer said parachute on a flight path to said target landing area and to control a rate of descent for said precision parachute recovery system which allows for a non-destructive touchdown and landing of said precision parachute recovery system within said target landing area; and
    (d) a target drone removably coupled to said servo system to allow said target drone to be removed from said servo system after the non-destructive landing of said precision parachute recovery system within said target landing area.

11. The parachute recovery system of claim 10 wherein said plurality of control lines comprises six control lines.

12. The parachute recovery system of claim 10 wherein said servo system further comprises a beacon having an antenna for transmitting radio frequency signals which provide location data for said parachute recovery system relating to a direction of flight of said parachute recovery system and a current position for said parachute recovery system.

13. A precision parachute recovery system comprising:
    (a) a generally rectangular shaped parachute having a parachute body, said parachute body having a plurality of individual cells arranged side-by-side along the width of said parachute;

(b) six control lines, a first, a second and a third of said six control lines having one end thereof connected to one side of said parachute and a fourth, a fifth and a sixth of said control having said one end thereof connected to an opposite side of said parachute, each of said control lines having an opposite end;

(c) a servo system having the opposite end of each of said six control lines connected thereto, said servo system separately adjusting the length of each of said six control lines to steer said parachute including:
   (i) an antenna for receiving global positioning system data in a radio frequency signal format, said global positioning system data, said global positioning data including longitude, latitude and altitude data and rate of descent data for said precision parachute recovery system;
   (ii) a digital computer connected to said antenna to receive said global positioning system data;
   (iii) six servo motors connected to said digital computer, each of said six servo motors having a shaft and a capstan attached to the shaft of each of said six servo motors, the capstan of each servo motor having the opposite end of only one of said six control lines connected thereto;
   (iv) said digital computer processing said global positioning system data and said target landing area coordinates to generate a plurality of positioning signals and to provide said positioning signals to said six servo motors;
   (v) said six servo motors, responsive to said positioning signals, rotating said capstans to continuously adjust the length of each of said six control lines to steer said parachute on a flight path to said target landing area and to control a rate of descent for said precision parachute recovery system which allows for a non-destructive touchdown and landing of said precision parachute recovery system within said target landing area;

and (d) a target drone removably coupled to said servo system to allow said target drone to be removed from said servo system after the non-destructive landing of said precision parachute recovery system within said target landing area.

14. The parachute recovery system of claim 13 wherein said servo system further comprises a beacon having an antenna for transmitting radio frequency signals which provide location data for said parachute recovery system relating to a direction of flight of said parachute recovery system and a current position for said parachute recovery system.

* * * * *